United States Patent
Li et al.

(10) Patent No.: US 12,072,023 B2
(45) Date of Patent: Aug. 27, 2024

(54) DIFFERENTIAL LOCK AND PARKING STRUCTURE FOR DUAL POWER SOURCE DRIVING SPEED REDUCER

(71) Applicant: Jing-Jin Electric Technologies Co., Ltd., Beijing (CN)

(72) Inventors: Jianwen Li, Beijing (CN); Fei Wang, Beijing (CN); Guodong Mu, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 14 days.

(21) Appl. No.: 17/997,411

(22) PCT Filed: Jul. 24, 2020

(86) PCT No.: PCT/CN2020/104044
§ 371 (c)(1),
(2) Date: Oct. 28, 2022

(87) PCT Pub. No.: WO2022/007015
PCT Pub. Date: Jan. 13, 2022

(65) Prior Publication Data
US 2023/0167898 A1   Jun. 1, 2023

(30) Foreign Application Priority Data

Jul. 7, 2020 (CN) .................. 202010647814.X

(51) Int. Cl.
*F16H 63/34* (2006.01)
*B60K 1/02* (2006.01)
(Continued)

(52) U.S. Cl.
CPC .......... *F16H 63/3425* (2013.01); *B60K 1/02* (2013.01); *F16H 48/24* (2013.01); *F16H 48/34* (2013.01);
(Continued)

(58) Field of Classification Search
CPC .. F16H 63/3425; F16H 63/3466; F16H 63/40; F16H 48/24; F16H 48/34;
(Continued)

(56) References Cited

U.S. PATENT DOCUMENTS 9,394,993 B2 * 7/2016 Persson ................. F16D 63/006
10,837,521 B2 * 11/2020 Kamiya ................ F16H 57/021
(Continued)

FOREIGN PATENT DOCUMENTS

CN    102596617 A    7/2012
CN    104553711 A    4/2015
(Continued)

OTHER PUBLICATIONS

PCT International Search Report mailed Apr. 8, 2021, issued in PCT Application No. PCT/CN2020/104044.
(Continued)

*Primary Examiner* — Jacob S. Scott
*Assistant Examiner* — Farhana Pervin
(74) *Attorney, Agent, or Firm* — ARENTFOX SCHIFF LLP

(57) ABSTRACT

A differential lock and parking structure is provided for a dual power source driving speed reducer, that includes first and second shafts, a differential lock mechanism, and a parking mechanism. The first and second shafts are connected to dual power sources, respectively; the differential lock mechanism and the parking mechanism are provided at the tail ends of the first and second shafts; and the differential lock mechanism includes a movable chainring assem-
(Continued)

bly, a fixed chainring assembly, and a fixed armature assembly. The parking mechanism includes a parking gear integrated with a fixed chainring, a pawl assembly, and a parking cam assembly that drives the pawl assembly to realize the conversion between parking-in and parking-out.

13 Claims, 3 Drawing Sheets

(51) Int. Cl.
  *F16H 48/24* (2006.01)
  *F16H 48/34* (2012.01)
  *F16H 63/40* (2006.01)
(52) U.S. Cl.
  CPC ......... *F16H 63/3466* (2013.01); *F16H 63/40* (2013.01)
(58) Field of Classification Search
  CPC ...... F16H 48/22; F16D 63/006; F16D 27/118; B60K 1/02; B60T 1/005; B60T 1/062
  See application file for complete search history.

(56) References Cited

U.S. PATENT DOCUMENTS

| | | | |
|---|---|---|---|
| 11,192,436 B1* | 12/2021 | Puiu | B60K 17/16 |
| 2012/0258831 A1 | 10/2012 | Knoblauch et al. | |
| 2014/0144718 A1* | 5/2014 | Mair | F16H 63/3416 74/412 R |
| 2018/0236982 A1* | 8/2018 | Yano | B60T 1/005 |
| 2018/0370356 A1 | 12/2018 | Shigeta et al. | |
| 2019/0078676 A1* | 3/2019 | Komatsu | H01F 7/16 |
| 2019/0154149 A1* | 5/2019 | Gruber | B60K 1/00 |
| 2019/0309804 A1* | 10/2019 | Shibata | B60K 17/02 |
| 2020/0292356 A1* | 9/2020 | McGraner | F16H 48/24 |
| 2021/0010543 A1 | 1/2021 | Pei et al. | |

FOREIGN PATENT DOCUMENTS

| | | |
|---|---|---|
| CN | 108263187 A | 7/2018 |
| CN | 108443353 A | 8/2018 |
| CN | 110953341 A | 4/2020 |
| DE | 102011076279 A1 | 11/2012 |
| DE | 102011086743 A1 | 5/2013 |
| JP | 2007-247803 A | 9/2007 |
| JP | 2008-089092 A | 4/2008 |
| JP | 2014-065395 A | 4/2014 |
| JP | 2016-098970 A | 5/2016 |
| JP | 2019-006173 A | 1/2019 |
| WO | 2014151395 A1 | 9/2014 |
| WO | 2019184544 A1 | 10/2019 |

OTHER PUBLICATIONS

European Search Report in EP20944017.1, mailed Jul. 4, 2023, 4 pages.
Office Action received for Japanese Patent Application No. 2023-501180, mailed on Jan. 22, 2024, 12 pages (7 pages of English Translation and 5 pages of Original Document).

* cited by examiner

DIFFERENTIAL LOCK AND PARKING STRUCTURE FOR DUAL POWER SOURCE DRIVING SPEED REDUCER

CROSS-REFERENCE TO RELATED APPLICATIONS

This application is a National Phase of PCT/CN2020/104044, filed on Jul. 24, 2020, which claims priority to Chinese Patent Application No. 202010647814.X, filed on Jul. 7, 2020, the disclosures of each of which are hereby incorporated by reference in their entireties.

TECHNICAL FIELD

The present disclosure belongs to the technical field of new energy vehicles, and more specifically, relates to a differential lock and parking structure for a dual power source driven reducer.

BACKGROUND

In the current dual power source driven reducer, two power sources output power independently. When extreme off-road driving or getting unstuck is required, the ability of the power sources cannot be effectively utilized, which reduces the ability of getting unstuck and the driving pleasure of extreme off-road driving. Its parking must rely on the electronic brake and other mechanisms, which has a low reliability. When parking on a steep slope, there is a risk of incomplete parking and slipping.

SUMMARY

In view of the above problems, the present disclosure discloses a differential lock and parking structure for a dual power source driven reducer to overcome the above problems or at least partially solve the above problems.

In order to achieve the above object, the present disclosure adopts the following technical solutions.

A differential lock and parking structure for a dual power source driven reducer, comprising a first shaft, a second shaft, a differential lock mechanism and a parking mechanism, wherein the first shaft and the second shaft are directly or indirectly connected with two power sources respectively, the first shaft and the second shaft are coaxially arranged, and the differential lock mechanism and the parking mechanism are disposed at ends of the first shaft and the second shaft;

the differential lock mechanism comprises a movable fluted disc assembly, a fixed fluted disc assembly and a fixed armature assembly, the movable fluted disc assembly is slidably connected to the first shaft, the fixed fluted disc assembly is fixedly connected to the second shaft, and when relative rotation of the first shaft and the second shaft needs to be locked, the fixed armature assembly is energized to generate an electromagnetic force to move the movable fluted disc assembly toward the fixed fluted disc assembly, and to make end face teeth on the movable fluted disc assembly and the fixed fluted disc assembly mesh with each other;

the parking mechanism comprises a parking gear, a pawl assembly and a parking cam assembly, the parking gear and the fixed fluted disc assembly are integrally provided, the pawl assembly is engaged with the parking gear, and the parking cam assembly is configured to drive the pawl assembly to switch between a parking-in position and a parking-out position.

Optionally, the movable fluted disc assembly comprises a movable gear sleeve and a movable armature;

the movable gear sleeve is slidably connected to the first shaft, and a front end face of the movable gear sleeve is provided with end face teeth;

the movable armature is rotatably sleeved on a rear end of the movable gear sleeve via a bearing;

when the fixed armature assembly is energized, the movable armature drives the movable gear sleeve to slide forward until the movable armature is engaged with the fixed armature assembly provided on a reducer housing.

Optionally, the movable gear sleeve is a stepped shaft sleeve, the stepped shaft sleeve is provided therein with a keyway, a rear end of the stepped shaft sleeve is successively provided with a movable gear sleeve circlip, a bearing retaining ring and a rolling bearing, the movable armature is sleeved on the rolling bearing, a movable armature circlip is provided at a rear end of a hole of the movable armature to fix the rolling bearing in the hole of the movable armature.

Optionally, a front end of the movable gear sleeve is further provided with a circular groove, a return spring is provided in the circular groove, a spring baffle is fixed on the first shaft at a position close to an end of the first shaft via a baffle circlip, and when the fixed armature assembly is powered off, the movable gear sleeve returns to its original position by means of the return spring.

Optionally, an anti-rotation pin is provided on the reducer housing or an end cover, and a pin hole engaged with the anti-rotation pin is provided on the movable armature to prevent the movable armature from rotating relative to the fixed armature assembly.

Optionally, the reducer housing is further provided with a position sensor for detecting a real-time position of the movable fluted disc assembly.

Optionally, the fixed fluted disc assembly comprises a fixed fluted disc and a positioning circlip;

the fixed fluted disc is fixedly connected with the second shaft, a rear end face of the fixed fluted disc is provided with end face teeth, and the positioning circlip is installed on the second shaft and abuts against the fixed fluted disc.

Optionally, a front end of the first shaft is provided with a cylindrical recess, an end of the second shaft is provided with a cylindrical protrusion, and an auxiliary bearing is provided between the recess and the protrusion.

Optionally, the pawl assembly comprises a pawl, a pawl rotating shaft, a roller, a roller pin and a torsion spring;

the roller is mounted on the pawl via the roller pin, the pawl rotating shaft is fixed on the reducer housings at two sides of the reducer, one side of the torsion spring is fixed on a right side of the reducer housing, and the other side of the torsion spring is fixed on the pawl.

Optionally, the parking cam assembly comprises a parking guide shaft, a parking cam, a parking cam position-limiting plate, an axial position-limiting ring, and a paddle spring;

the axial position-limiting ring and the parking guide shaft are assembled with an interference fit to fix the parking cam and the parking cam position-limiting plate on the parking guide shaft, and the paddle spring is installed on the parking cam and a mounting column that extends from the parking cam position-limiting plate;

one end of the parking guide shaft is connected to a parking motor, and the other end of the parking guide shaft is clearance fitted with a hole on a reducer housing.

The advantages and beneficial effects of the present disclosure are as follows.

By installing the above differential lock and parking structure, when the vehicle needs to get unstuck or perform extreme off-road driving, the relative rotation between two power sources can be locked by the differential lock mechanism, thereby coupling the power of two power sources, realizing the power transmission according to the demand, and improving the maximum torque of the single output, and thus improving the ability of the vehicle to get unstuck when it is stuck in swamps, mud pits, etc.

Further, in the reducer disclosed in the present disclosure, the parking gear of the parking mechanism is disposed on the fixed fluted disc, and the vehicle is parked via the pawl assembly and the cam assembly, thereby realizing mechanical parking and improving the safety of parking.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
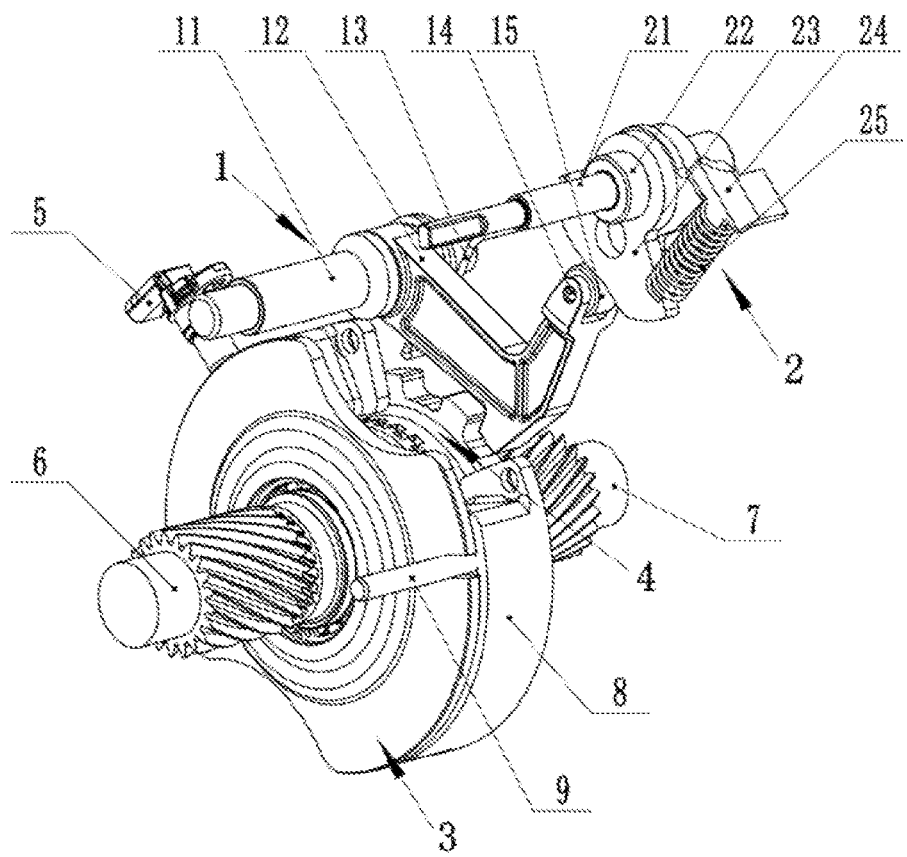
FIG. 1 is a schematic view of the structure of a differential lock and a parking mechanism according to an embodiment of the present disclosure.

In the drawings:
1. pawl assembly; 11. pawl rotating shaft; 12. pawl; 13. torsion spring; 14. roller pin; 15. roller;
2. parking cam assembly; 21. parking guide shaft; 22. axial position-limiting ring; 23. parking cam; 24. parking cam position-limiting plate; 25. paddle spring;
3. movable fluted disc assembly; 31. movable gear sleeve; 32. movable gear sleeve circlip; 33. bearing retaining ring; 34. movable armature; 35. movable armature circlip; 36. rolling bearing; 37. return spring; 38. spring baffle; 39. baffle circlip;
4. fixed fluted disc assembly; 41 fixed fluted disc; 42 positioning circlip;
5. position sensor;
6. first shaft; 61. rolling bearing;
7. second shaft;
8. fixed armature assembly;
9. anti-rotation pin.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described herein are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

It should be noted that the terms "comprise/include", "composed of" or any other variants are intended to cover non-exclusive inclusion, so that the product, equipment, process or method including a series of elements may not only include those elements, but may also include other elements not stated explicitly, or elements inherent to the product, equipment, process or method. Without more limitations, an element defined by the phrase "comprise/include . . . ", "composed of . . . " does not exclude the case that there are other same elements in the product, equipment, process or method including the elements.

The technical solutions provided by various embodiments of the present disclosure will be described in detail below in conjunction with the accompanying drawings.

As shown in FIG. 1, this embodiment of the present disclosure discloses a differential lock and parking structure for a dual power source driven reducer. The structure comprises a first shaft 6, a second shaft 7, a differential lock mechanism, and a parking mechanism. The first shaft 6 and the second shaft 7 are directly or indirectly connected with two power sources respectively. The two power sources may be disposed inside the reducer, or may be disposed outside the reducer. The first shaft and the second shaft are coaxially arranged. The differential lock mechanism and the parking mechanism are disposed at ends of the first shaft and the second shaft. According to the positional relationship in FIG. 1, the differential lock mechanism and the parking mechanism are located at a middle position of the reducer.

The differential lock mechanism comprises a movable fluted disc assembly 3, a fixed fluted disc assembly 4 and a fixed armature assembly 8. The movable fluted disc assembly 3 is slidably connected to the first shaft 6, the fixed fluted disc assembly 4 is fixedly connected to the second shaft 7, and the fixed armature assembly 8 may be fixed to a reducer housing. Preferably, the fixed armature assembly 8 comprises a fixed armature, an electromagnetic coil and a buffer pad. The electromagnetic coil is wound on the fixed armature, and the buffer pad is disposed on a side opposite to the movable fluted disc assembly.

When the relative rotation of the first shaft and the second shaft needs to be locked, the fixed armature assembly 8 is energized to generate an electromagnetic force to move the movable fluted disc assembly 3 toward the fixed fluted disc assembly 4, and make end face teeth on the movable fluted disc assembly 3 and the fixed fluted disc assembly 4 mesh with each other.

According to FIG. 1, the parking mechanism comprises a parking gear 41, a pawl assembly 1 and a parking cam assembly 2. The parking gear 41 and the fixed fluted disc assembly 4 are integrally provided. Preferably, the parking gear is disposed on the circumference of the fixed fluted disc 41 in the fixed fluted disc assembly 4; the pawl assembly 1 is engaged with the parking gear 41, and the parking cam assembly 2 is configured to drive the pawl assembly 1 to switch between a parking-in position and a parking-out position.

In this embodiment, when a vehicle with the above reducer drives normally, the differential lock is in an unlocked state, and two power sources are directly or indirectly connected rigidly with the first shaft and the second shaft respectively and transmit power, the power is output to the wheels through the gear reduction mechanism and a half shaft to drive the whole vehicle. At this moment, the turning is realized by controlling two power sources to have different rotational speeds. There is no power output coupling between the two power sources. The wheels on two sides of the vehicle are connected rigidly to the respective power sources through shafts, gears, etc. A rolling bearing support may be provided between the first shaft and the second shaft to ensure the coaxiality of two shafts and the flexibility of relative rotation.

When it is necessary to get unstuck or perform extreme off-road driving, the differential lock mechanism may be used to lock the relative rotation between the two power sources and transfer the power to each other as required, so as to achieve the maximum torque of a single output and improve the ability of getting unstuck. At this moment, there is power coupling.

The differential lock mechanism comprises a fixed fluted disc assembly, a movable fluted disc assembly and a fixed armature assembly. Its specific actions are as follows. The fixed armature assembly is energized to generate an electromagnetic force, which causes the movable fluted disc assembly to move toward the fixed armature assembly and the fixed fluted disc assembly, and contact the fixed armature assembly and limit its position. At this moment, the movable fluted disc assembly and the fixed fluted disc assembly are engaged by end face teeth to realize locking of the differential lock, thereby ensuring that the first shaft and the second shaft have the same rotational speed and are relatively locked. At this moment, the powers of the two power sources are coupled, and the output of one of them can increase torque according to the load, thereby realizing the function of getting unstuck or extreme off-road driving.

Figure 2:
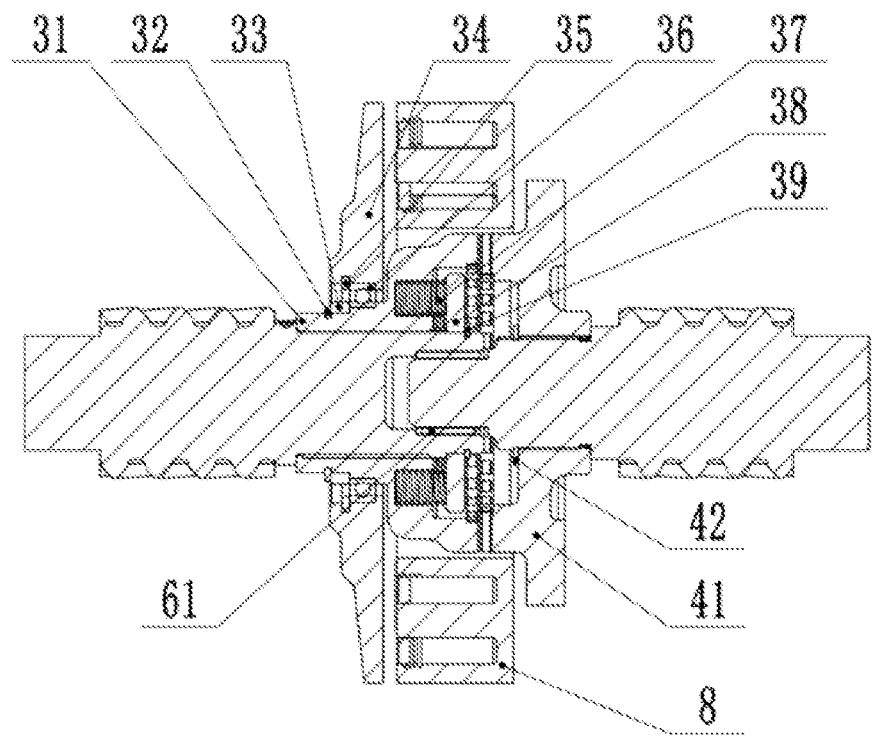
FIG. 2 is a schematic view of the structure of a differential lock in an unlocked state according to an embodiment of the present disclosure.
Figure 3:
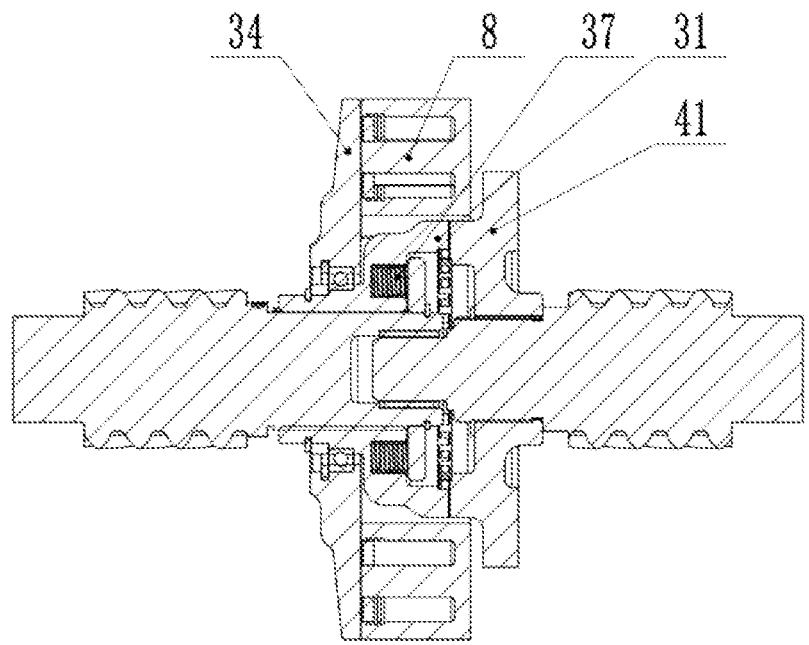
FIG. 3 is a schematic view of the structure of a differential lock in a locked state according to an embodiment of the present disclosure.

Referring to FIGS. 2 and 3, in an embodiment or embodiments, the movable fluted disc assembly 3 comprises a movable gear sleeve 31 and a movable armature 34. The movable gear sleeve 31 is preferably slidably connected to the first shaft 6 by splines or the like. The front end face of the movable gear sleeve 31 is provided with end face teeth. The movable armature 34 is rotatably disposed at the rear end of the movable gear sleeve by being sleeved on a bearing. When the fixed armature assembly 8 is energized, the movable armature 34 drives the movable gear sleeve 31 to slide forward until the movable armature 34 is engaged with the fixed armature assembly 8 disposed on the reducer housing.

As shown in FIG. 2, the movable gear sleeve 31 is a stepped shaft sleeve, and a keyway is provided inside the stepped shaft sleeve. A spline may be provided in the keyway to be slidably connected with the first shaft 6. A rear end of the stepped shaft sleeve is successively sleeved with a movable gear sleeve circlip 32, a bearing retaining ring 33 and a rolling bearing 36. The movable armature 34 is sleeved on the rolling bearing 36, and a movable armature circlip 35 is provided at a rear end of a hole of the movable armature 34 to fix the rolling bearing 36 in the hole of the movable armature 34.

In this embodiment, the movable gear sleeve is connected with the movable armature via a rolling bearing to ensure the reliability and stability of the relative rotation of them. After the movable armature is connected with the bearing, the relative position between the movable armature and the movable gear sleeve is limited by the movable armature circlip. After the movable gear sleeve is connected with the bearing, the axial position of the rolling bearing is limited by the bearing retaining ring and the movable gear sleeve circlip to ensure the relative position of the movable gear sleeve and the movable armature.

In an embodiment, the front end of the movable gear sleeve is also provided with a circular recess, and a return spring 37 is provided in the circular recess. A spring baffle 38 is fixed on the first shaft 6 at a position close to an end of the first shaft via a baffle circlip 39, and when the fixed armature assembly is powered off, the movable gear sleeve returns to its original position by means of the return spring.

The movable gear sleeve 31 is flexibly connected with the spring baffle 38 by the return spring 37. The spring baffle 38 is connected with the first shaft in an interference fit via the cylindrical surface, and the axial movement freedom of the spring baffle 38 on the first shaft is limited by the baffle circlip 39. The function of the return spring is to ensure the reliability of the unlocked state of the differential lock and quick position return when it needs to unlock the differential lock. The force to be generated by the return spring is jointly determined by factors such as the mass of the movable fluted disk assembly, the ability to maintain the unlocked state, a corresponding speed of unlocking the differential lock, etc.

In an embodiment, an anti-rotation pin 9 is provided on the reducer housing or an end cover, and a pin hole engaged with the anti-rotation pin is provided on the movable armature to prevent the movable armature from rotating relative to the fixed armature assembly.

The function of the anti-rotation pin 9 is to circumferentially limit the position of the movable armature, so as to ensure that the movable armature does not rotate relative to the fixed armature assembly, avoid friction between them, and improve the locking reliability.

In an embodiment, the reducer housing is further provided thereon with a position sensor for detecting a real-time position of the movable fluted disc assembly, so that the controller can judge and issue a corresponding command according to the real-time position.

In an embodiment, the fixed fluted plate assembly 4 comprises a fixed fluted plate 41 and a positioning circlip 42. The fixed fluted disc 41 is fixedly connected with the second shaft 6, the rear end face of the fixed fluted disc 41 is provided with end face teeth, and the positioning circlip 42 is mounted on the second shaft 7 and abuts against the fixed fluted disc 41. In an embodiment, as shown in FIG. 2 or FIG. 3, the front end of the first shaft is provided with a cylindrical recess, the end of the second shaft is provided with a cylindrical protrusion, and an auxiliary bearing 61 is provided between the recess and the protrusion. The above structure can ensure the coaxiality and stability of the end face tooth engagement. In an embodiment, the pawl assembly 1 comprises a pawl 12, a pawl rotating shaft 11, a roller 15, a roller pin 14, and a torsion spring 13. The roller 15 is mounted on the pawl 12 via the roller pin 14, the pawl rotating shaft 11 is fixed on the housing at two sides of the reducer, one side of the torsion spring 13 is fixed on the right side of the reducer housing, and the other side of the torsion spring 13 is fixed on the pawl 12.

In an embodiment, the parking cam assembly 2 comprises a parking guide shaft 21, a parking cam 23, a parking cam position-limiting plate 24, an axial position-limiting ring 22, and a paddle spring 25. The axial position-limiting ring 22 and the parking guide shaft 21 are assembled in an interference fit to fix the parking cam 23 and the parking cam position-limiting plate 24 on the parking guide shaft 21, and leave a sufficient clearance to allow the parking cam to rotate flexibly around the parking guide shaft. The paddle spring 25 is mounted on the parking cam 23 and a mounting column that extends from the parking cam position-limiting plate 24. One end of the parking guide shaft is connected to the parking motor 62, and the other end of the parking guide shaft is clearance fitted with a hole on the reducer housing.

The paddle spring 25 can provide a certain preload to the parking cam 23, thereby realizing the flexible connection between the parking cam 23 and the pawl 12 and preventing the parking cam 23 and the pawl 12 from being stuck.

Figure 4:
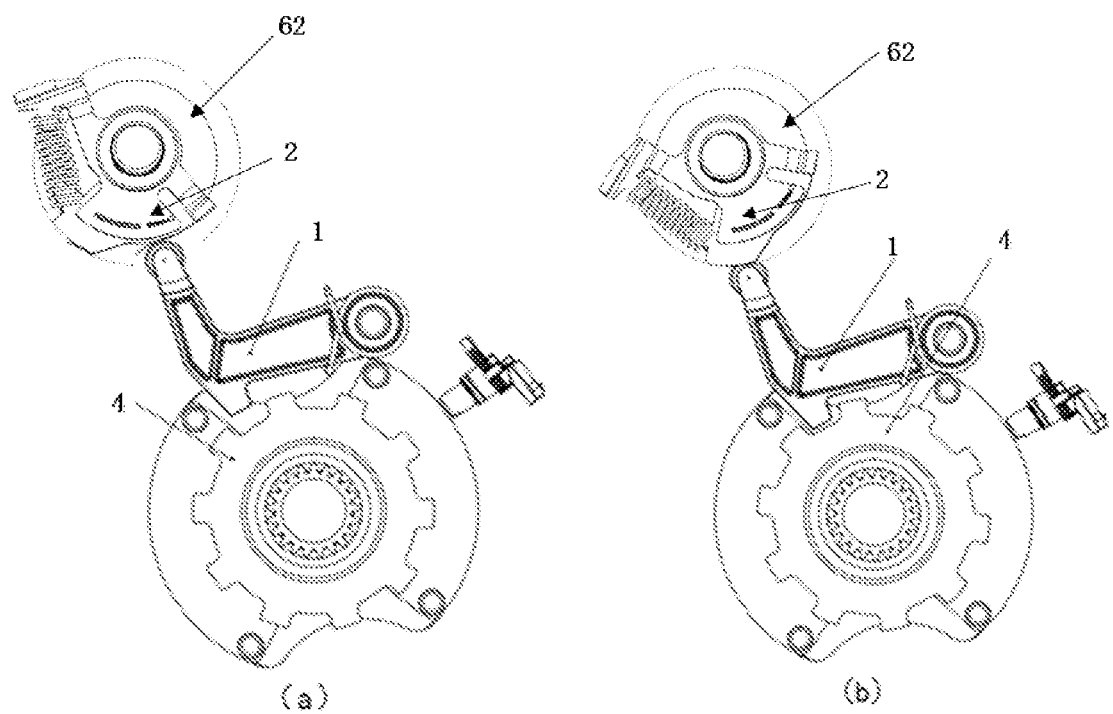
FIG. 4 is a schematic view of the structure of a parking mechanism in a parking-out state (a) or in a parking-in state (b) according to an embodiment of the present disclosure.

Referring to FIG. 4, the circumferential contour of the parking cam is configured to allow the pawl get in and get out of the notch of the parking gear when the parking cam rotates in a circumferential direction, thereby completing the parking-in and parking-out actions. Specifically, the pawl is driven by the parking cam to rotate around the pawl rotating shaft, and the pawl can complete the lifting and pressing action. When the pawl is lifted, it is separated from the parking gear notch to complete the parking-out action. When the pawl is pressed down, it gets in the parking gear notch to complete the parking-in action. In addition, the torsion spring has a certain preload when it is installed. The preload makes the pawl always lift up, so that the pawl can always be in contact closely with the contour of the parking cam while moving.

The above only describes the specific embodiments of the present disclosure. Under the above teaching of the present disclosure, a person skilled in the art can make other improvements or modifications on the basis of the above embodiments. A person skilled in the art should understand that the above specific description is only for better explaining the present disclosure, and the protection scope of the present disclosure should be subject to the protection scope of the claims.

What is claimed is:

1. A differential lock and parking structure for a dual power source driven reducer, comprising:
   a first shaft;
   a second shaft; and
   a differential lock mechanism and a parking mechanism, wherein:
   the first shaft and the second shaft are directly or indirectly connected to two power sources respectively, the first shaft and the second shaft are coaxially arranged, and the differential lock mechanism and the parking mechanism are disposed at facing ends of the first shaft and the second shaft;
   the differential lock mechanism comprises a movable fluted disc assembly, a fixed fluted disc assembly and a fixed armature assembly, the movable fluted disc assembly is slidably connected to the first shaft, the fixed fluted disc assembly is fixedly connected to the second shaft,
   the fixed armature assembly is configured to be energized to generate an electromagnetic force to move the movable fluted disc assembly toward the fixed fluted disc assembly to mesh end face teeth on the movable fluted disc assembly with end face teeth on the fixed fluted disc assembly in order to lock a relative rotation of the first shaft and the second shaft, and
   the parking mechanism comprises a parking gear, a pawl assembly and a parking cam assembly, the parking gear and the fixed fluted disc assembly are integrally provided, the pawl assembly is engaged with the parking gear, and the parking cam assembly is configured to drive the pawl assembly to switch between a parking-in position and a parking-out position.

2. The structure according to claim 1, wherein:
   the movable fluted disc assembly comprises a movable gear sleeve and a movable armature;
   the movable gear sleeve is slidably connected to the first shaft, and a front end face of the movable gear sleeve is provided with end face teeth; and
   the movable armature is rotatably sleeved on a rear end of the movable gear sleeve via a rolling bearing; and
   wherein, when the fixed armature assembly is energized, the movable armature drives the movable gear sleeve to slide forward until the movable armature is engaged with the fixed armature assembly provided on a reducer housing.

3. The structure according to claim 2, wherein the movable gear sleeve is a stepped shaft sleeve that is provided therein with a keyway, a rear end of the stepped shaft sleeve is successively provided with a movable gear sleeve circlip, a bearing retaining ring and the rolling bearing, the movable armature is sleeved on the rolling bearing, a movable armature circlip is provided at a rear end of a hole of the movable armature to fix the rolling bearing in the hole of the movable armature.

4. The structure according to claim 2, wherein a front end of the movable gear sleeve is further provided with a circular recess, a return spring is provided in the circular recess, a spring baffle is fixed on the first shaft at a position close to an end of the first shaft via a baffle circlip, and when the fixed armature assembly is powered off, the movable gear sleeve returns to its original position by means of the return spring.

5. The structure according to claim 2, wherein an anti-rotation pin is provided on the reducer housing, and a pin hole engaged with the anti-rotation pin is provided on the movable armature to prevent the movable armature from rotating relative to the fixed armature assembly.

6. The structure according to claim 2, wherein the reducer housing is further provided with a position sensor for detecting a real-time position of the movable fluted disc assembly.

7. The structure according to claim 3, wherein a front end of the movable gear sleeve is further provided with a circular recess, a return spring is provided in the circular recess, a spring baffle is fixed on the first shaft at a position close to an end of the first shaft via a baffle circlip, and when the fixed armature assembly is powered off, the movable gear sleeve returns to its original position by means of the return spring.

8. The structure according to claim 3, wherein an anti-rotation pin is provided on the reducer housing or an end cover, and a pin hole engaged with the anti-rotation pin is provided on the movable armature to prevent the movable armature from rotating relative to the fixed armature assembly.

9. The structure according to claim 3, wherein the reducer housing is further provided with a position sensor for detecting a real-time position of the movable fluted disc assembly.

10. The structure according to claim 1,
    wherein the fixed fluted disc assembly comprises a fixed fluted disc and a positioning circlip; and
    wherein the fixed fluted disc is fixedly connected with the second shaft, a rear end face of the fixed fluted disc is provided with end face teeth, and the positioning circlip is installed on the second shaft and abuts against the fixed fluted disc.

11. The structure according to claim 1, wherein a front end of the first shaft is provided with a cylindrical recess, an end of the second shaft is provided with a cylindrical protrusion, and an auxiliary bearing is provided between the recess and the protrusion.

12. The structure according to claim 1,
wherein the pawl assembly comprises a pawl, a pawl rotating shaft, a roller, a roller pin and a torsion spring; and
wherein the roller is mounted on the pawl via the roller pin, the pawl rotating shaft is fixed on a reducer housing at two sides of the reducer, one side of the torsion spring is fixed on a right side of the reducer housing, and the other side of the torsion spring is fixed on the pawl.

13. The structure according to claim 1,
wherein the parking cam assembly comprises a parking guide shaft, a parking cam, a parking cam position-limiting plate, an axial position-limiting ring, and a paddle spring; and
wherein the axial position-limiting ring and the parking guide shaft are assembled with an interference fit to fix the parking cam and the parking cam position-limiting plate on the parking guide shaft, and the paddle spring is installed on the parking cam and a mounting column that extends from the parking cam position-limiting plate;
wherein one end of the parking guide shaft is connected to a parking motor, and the other end of the parking guide shaft is clearance fitted with a hole on a reducer housing.

* * * * *